United States Patent [19]

Kuzel

[11] 4,125,280
[45] Nov. 14, 1978

[54] MULTITUBE HEAT EXCHANGER

[75] Inventor: Josef J. Kuzel, Mississauga, Canada

[73] Assignee: Borg-Warner Corporation, Chicago, Ill.

[21] Appl. No.: 803,701

[22] Filed: Jun. 6, 1977

[51] Int. Cl.² ............................................. F16L 39/00
[52] U.S. Cl. ................................ 285/137 R; 29/450; 285/158
[58] Field of Search ........................ 16/2; 285/233, 158, 285/137 R, 223, 159, 196, 162; 29/450, 451

[56] References Cited

U.S. PATENT DOCUMENTS

| 784,192 | 3/1905 | Throop | 285/223 |
|---|---|---|---|
| 2,229,587 | 1/1941 | Porker | 285/233 |
| 2,326,292 | 8/1943 | Dormon | 285/196 |
| 2,814,405 | 11/1957 | Edwards | 29/450 |
| 2,849,201 | 8/1958 | Schelgunov | 29/450 |
| 2,901,144 | 8/1959 | Haustrup | 29/450 X |
| 3,576,335 | 4/1971 | Kowal | 285/286 |
| 3,811,711 | 5/1974 | Torkenton | 285/137 R |

Primary Examiner—Dave W. Arola
Attorney, Agent, or Firm—James A. Geppert

[57] ABSTRACT

A method of sealing round tubes of a tube and fin bundle to a tube header wherein the tube and fin bundle and opposite headers are assembled into opposed header tanks to form a radiator or heat exchanger. The method includes the steps of rolling the tube ends, positioning a grommet over the curled tube end, and inserting the tube and grommet into an opening in the tube header.

7 Claims, 8 Drawing Figures

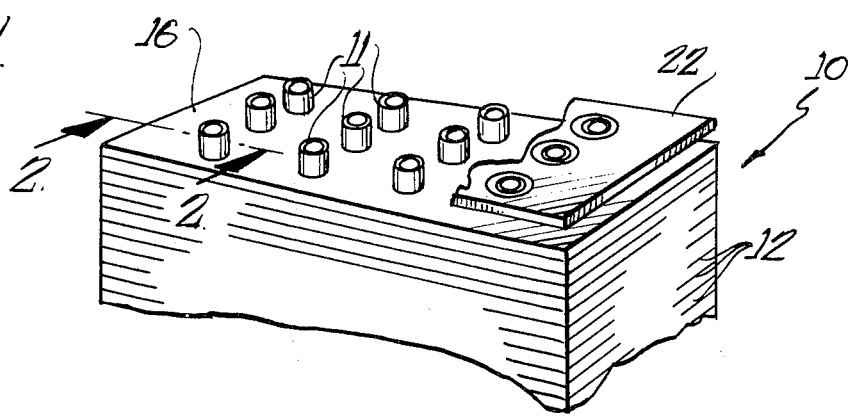
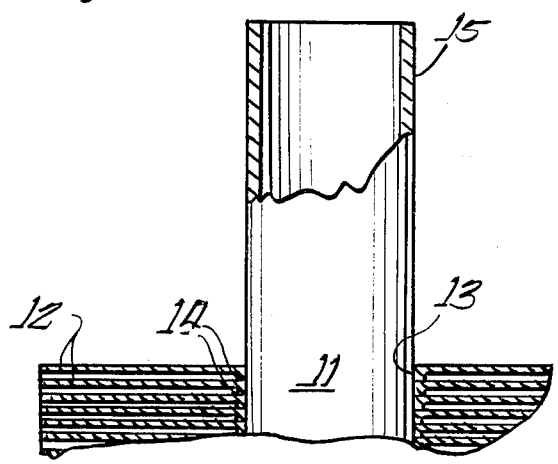
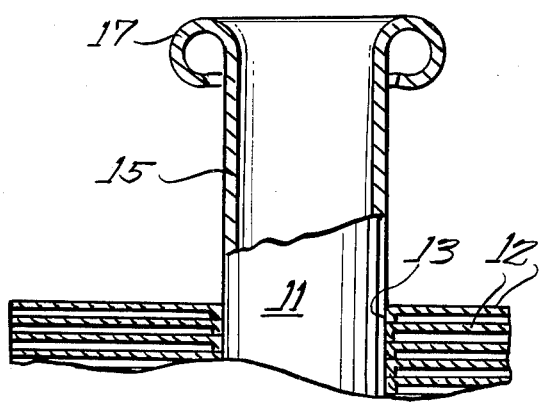
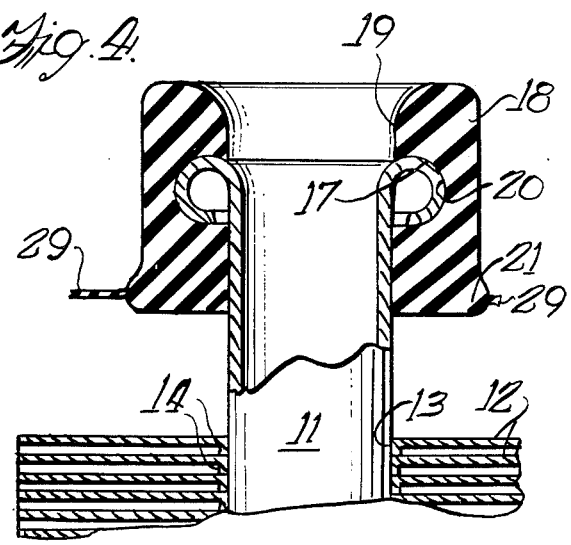
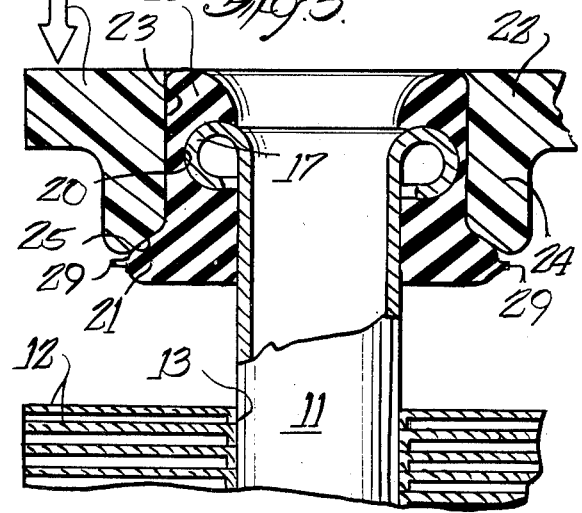

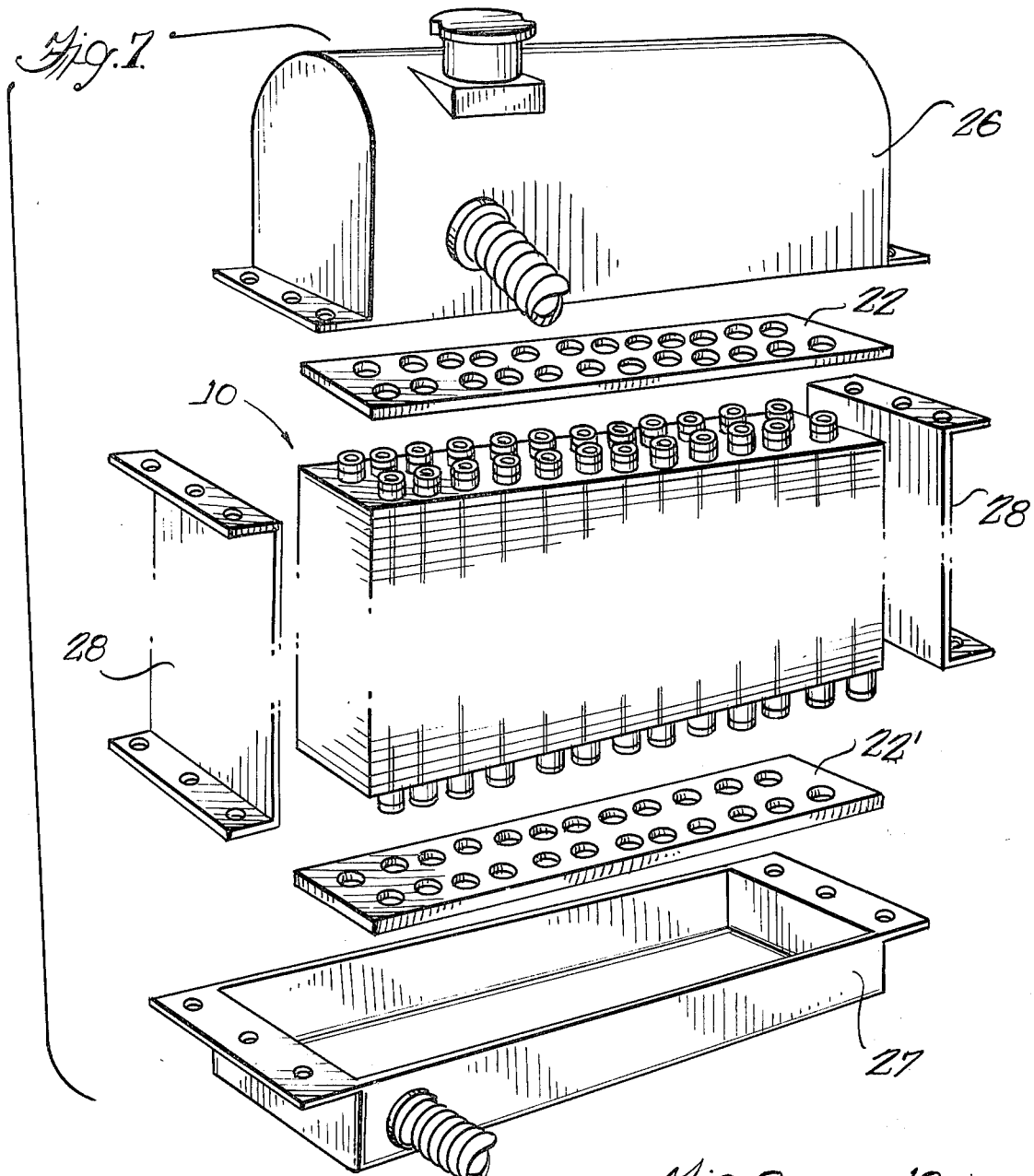
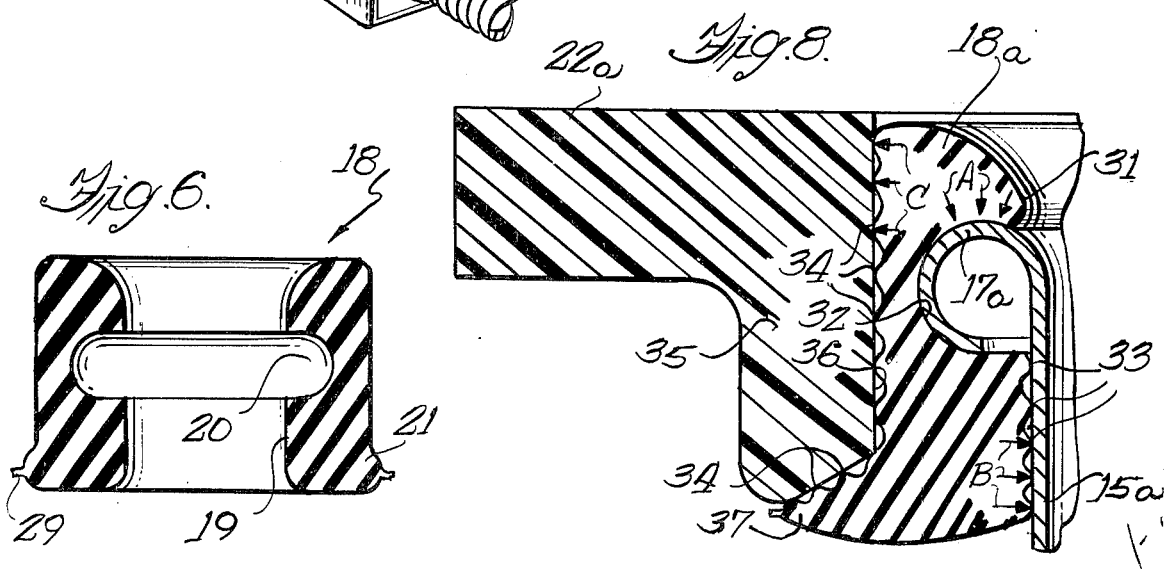

MULTITUBE HEAT EXCHANGER

BACKGROUND AND SUMMARY OF THE INVENTION

In manufacturing heat exchangers of the tube and fin type where the tube ends project through a tube sheet or header plate, it is conventional to braze, solder, or weld the projecting ends of the tubes to the header plate. Such a sealing procedure is an expensive and time consuming operation. Another method of joining the tubes and header plate involves roll-expanding of the tubes or crimping operations. None of these methods are entirely satisfactory in providing a leak-proof joint.

More recently, resilient O-rings have been utilized with a tube rolling and crimping operation or potting compounds have been utilized to fill in the spaces between the tube ends and oversize openings in the header plates. However, these multi-operation sealing procedures are expensive and time consuming. The present invention obviates the disadvantages of these previously discussed methods of sealing.

The present invention comprehends the provision of a simplified method of sealing round tubes into a header-tank manifold or tube header. The method utilizes resilient grommets which are positioned over the ends of the tubes and are received in openings in the tube header. The exterior dimensions of the grommets are larger than the interior dimension of a header opening so that insertion of the grommet and tube into the tube header will compress the grommet around the exterior of the tube end.

The present invention also comprehends the provision of a method of sealing round tube ends into a header plate where the tube ends are initially rolled to provide an exterior bead or collar and the resilient grommets are fitted over the rolled tube end with the bead received in a groove in the grommet to retain the grommet in position when assembled into the header plate.

The present invention further comprehends a novel sealed connection between a core tube and a tube header plate mounted in a heat exchanger where the internal pressure will not be able to blow the grommet out of the header plate nor will the internal vacuum upon filling the system be able to suck the grommet into the tank.

Further objects are to provide a method and construction of maximum simplicity, efficiency, economy and ease of assembly, and such further objects, advantages and capabilities as will later more fully appear and are inherently possessed thereby.

DESCRIPTION OF THE DRAWINGS

FIG. 1 is a perspective view of a multiple tube and fin core for assembly into a heat exchanger.

FIG. 2 is an enlarged cross sectional view taken on the line 2—2 of FIG. 1 and showing a tube prior to sealing in a tube header plate.

FIG. 3 is a view similar to FIG. 2 but showing the mechanical rolling of the tube end.

FIG. 4 is a view similar to FIG. 3 but with a grommet assembled.

FIG. 5 is a view similar to FIG. 4 but with the tube assembled in a header plate.

FIG. 6 is a vertical cross-sectional view of the grommet.

FIG. 7 is an exploded perspective view of a radiator incorporating the tube sealing method.

FIG. 8 is an enlarged partial vertical cross-sectional view of an alternate form of grommet assembled on a tube end in a header.

DESCRIPTION OF THE PREFERRED EMBODIMENT

Referring more particularly to the disclosure in the drawing wherein is shown an illustrative embodiment of the present invention, FIG. 1 discloses a tube and fin core 10 to be used in a heat exchanger (FIG. 7), such as an automobile radiator, oil cooler, etc., with the core including a plurality of generally parallel tubes 11 and a stack of thin metal fins or plates 12. Each fin 12 is provided with a plurality of openings 13 (see FIG. 2) defined by annular flanges 14 adapted to conformably receive the tubes therein. To assemble, the tubes 11, formed of a heat-conductive metal such as copper or aluminum, are pushed through the holes 13 in the fins 12, and the tubes are expanded to make a tight mechanical bond with the fins. The annular flanges 14 on the fins provide a self-spacing function between the fins in the stack.

The core 10, as shown in FIG. 1, has a plurality of exposed tube ends 15 at each end 16 of the finned stack. To secure the tubes in a header plate, each tube end 15 (FIG. 2) is rolled over to provide a bead or collar 17 (FIG. 3). Next, a resilient grommet or sealing member 18 of a generally cylindrical form is positioned over the end of the tube 11 over the rolled bead 17 (FIG. 4). The grommet 18 has a central passage 19 to receive the tube end, an internal annular groove 20 and a lower outward bead 21 thereon. The rolled end or bead 17 is received in the annular groove 20 in the grommet, as seen in FIG. 4; with the resilient material forming around the rolled end 17 so as to be retained on the tube. The grommet may be formed of any suitable resilient material, such as rubber or a plastic having suitable sealing characteristics over the temperature range for the radiator.

Finally, a tube header plate 22 is provided, which is adapted to be secured in a heat exchanger body, having openings 23 defined by depending flanges 24; the diameter of an opening 23 being slightly less than the external diameter of the grommet 18. The tube header 22 is forced down over the grommets in the direction of the arrow F (FIG. 5), with the grommets 18 being compressed and the direction of movement of the header causing the lower bead 21 on each grommet to be partially extruded outwardly over the lower edge 25 of the flange 24 to promote sealing of the tubes in the tube header. A plurality of grommets 18 are molded in a single operation with a connecting membrane 29 therebetween to provide ease of assembly of the grommets on the tube ends.

This tube and fin core unit 10 with upper and lower tube header plates 22, 22' is adapted for utilization with a vertical-flow radiator of a generally rigid plastic construction, such as shown in FIG. 7. This construction has a pair of header tanks 26, 27 of one piece rigid plastic construction. In the bottom header tank 27, an oil cooler (not shown) is inserted into the tank and the lower tube header 22' is welded on ultra-sonically. Likewise, the upper header 22 is ultra-sonically welded into the upper header tank 26. Core sides 28, 28 are assembled with the outlet header tank 27 and the tube and fin core 10 is inserted between the core sides with the rolled tube ends having grommets assembled thereon being inserted into the header of the outlet header tank. The grommets connected by the membrane 29 may be in single rows, multiple rows or all of the grommets may be connected by a single membrane 29. The inlet header tank 26 and header 22 is pressed against the core 10 to seal the tubes in the header. Then, the header tanks and core sides are bolted together to form the final radiator.

The present method of sealing the tubes in the tube headers provides a reduction of more than 50% in the sealing area between the header tank and the tube-fin core. Also, this method allows the use of one-piece header tanks and provides for ease of repairability of the heat exchanger. There is no secondary expansion of the tube ends to make a fixed seal, and the present seal is allowed to breath with the core. In the assembled heat exchanger or radiator, the internal pressure will not be able to blow the grommets out and, when filling the system, the internal vacuum will not be able to suck the grommets into a header tank. The membrane connecting the grommets will be located on the air side of the assembly.

Although this disclosure shows a downflow radiator for an automotive vehicle, the method of sealing the tube and fin core to tube headers can be utilized in other heater cores and general heat exchanger applications.

FIG. 8 discloses an alternate form of grommet 18a having an interior surface 31 with an annular groove 32 to receive the bead 17a on the tube end 15a and grip the bead as shown by arrows A, and a series of shallow grooves on surface 31 forming rings 33 engaging the exterior of the tubes as shown by arrows B. Likewise, the exterior surface of the grommet 18a is formed with a series of grooves forming axially spaced sealing rings 34 engaging the interior surface 36 of the depending flange 35 on header 22a as shown by arrows C. The grommet has a bead 37 at the lower end thereof.

I claim:

1. A method of sealing tube ends in a tube header comprising the steps of rolling the end of each tube outwardly and rearwardly to provide a rounded collar, positioning a resilient grommet on each rolled end, each grommet having internal and external generally cylindrical surfaces with an annular internal groove receiving said rolled collar therein, said internal suface entending through said grommet andsaid external grommet surface terminating at its lower edge in an outwardly extending lip, and forcing the tube end and grommet into an opening in said tube header wherein said opening is of smaller diameter than the external diameter of said grommet, said tube header having an annular flange with a lower end defining said opening with said flange engaging and extruding said grommet lip whereby forming said tube end and grommet into said opening causes downward and outward extrusion of said grommet lip over the lower end of the flange.

2. A sealed joint for a tube end in a tube header for a heat exchanger, comprising a tube having an outwardly rolled tube end providing a collar, a resilient grommet having internal and external generally cylindrical surfaces with an internal annular groove fitted over said rolled tube end with the annular groove receiving said collar, said internal cylindrical surface extending through said grommet, a tube header having an opening defined by a depending annular flange housing a lower end, said grommet terminating at its lower end in an outwardly extending lip, said tube header opening being of a smaller diameter than the external diameter of said grommet, said tube end and grommet being inserted into said opening through said flange whereby forcing said tube end and grommet into said tube header opening causes downward and outward extrusion of said grommet lip into sealing engagement over the lower end of the flange.

3. A sealed joint as set forth in claim 1, in which said tube header is adapted to be sealingly received in a one-piece rigid plastic header tank for a radiator.

4. A sealed joint as set forth in claim 1, in which said grommet is formed of rubber.

5. A sealed joint as set forth in claim 4, in which multiple grommets are joined by an integral membrane.

6. A sealed joint as set forth in claim 1, in which the outer surface of said grommet and lip is formed with a plurality of shallow annular grooves forming sealing rings engaging the interior surface defining the opening in said tube header.

7. A sealed joint as set forth in claim 6, in which the inner surface of said grommet below said first mentioned annular groove is provided with a plurality of shallow annular grooves forming sealing rings engaging the external surface of said tube.

* * * * *

UNITED STATES PATENT OFFICE
CERTIFICATE OF CORRECTION

PATENT NO. : 4,125,280
DATED : November 14, 1978
INVENTOR(S) : JOSEF JOHANN KUZEL It is certified that error appears in the above-identified patent and that said Letters Patent are hereby corrected as shown below:

Column 3, line 45, cancel "suface" and insert -- surface --.

Column 3, line 46, change "andsaid" to -- and said --.

Column 4, line 19, cancel "housing" and insert -- having --.

Column 4, line 29, cancel "1" and insert -- 2 --.

Column 4, line 32, cancel "1" and insert -- 2 --.

Column 4, line 36, cancel "1" and insert -- 2 --.

Signed and Sealed this

Twelfth Day of June 1979

[SEAL]

Attest:

RUTH C. MASON
*Attesting Officer*

DONALD W. BANNER
*Commissioner of Patents and Trademarks*